Feb. 20, 1968 W. DE PIETRO 3,369,533
METHOD OF AND APPARATUS FOR PREVENTION OF DEPOSITS OF CONTAMINANTS
IN THE FLOW PATH OF TURBO-COMPRESSORS
Filed Dec. 10, 1965
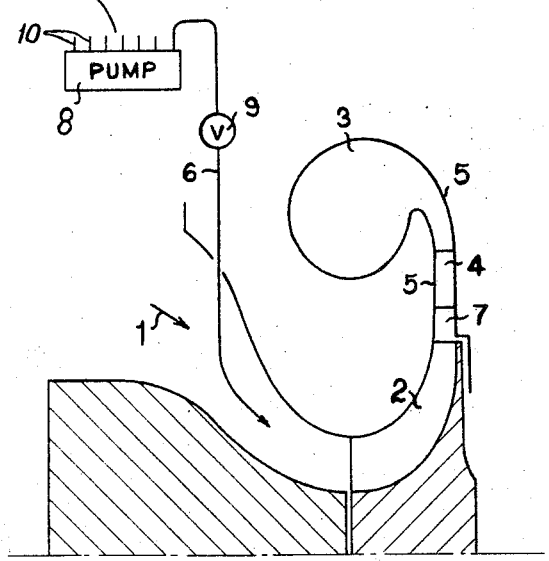
INVENTOR.
Walter de Pietro
BY
Pierce, Scheffler & Parker
Attorneys

United States Patent Office 3,369,533
Patented Feb. 20, 1968

3,369,533
METHOD OF AND APPARATUS FOR PREVENTION OF DEPOSITS OF CONTAMINANTS IN THE FLOW PATH OF TURBO-COMPRESSORS
Walter de Pietro, Schinznach-Bad, Switzerland, assignor to Aktiengesellschaft Brown, Boveri & Cie., Baden, Switzerland, a joint-stock company
Filed Dec. 10, 1965, Ser. No. 512,982
Claims priority, application Switzerland, Jan. 4, 1965, 55/65
1 Claim. (Cl. 123—119)

ABSTRACT OF THE DISCLOSURE

The fuel pump for an internal combustion engine of the type powered by diesel oil is provided with an auxiliary fuel discharge outlet in addition to those provided for direct injection of the fuel into the individual cylinders of the engine, this auxiliary fuel discharge outlet being connected with a radial type of air compressor for supplying combustion air to the engine. The oil which is admixed with the air in the compressor serves to wet the internal wall surfaces of the compressor and thereby prevents any build up of air contaminants such as dust on these wall surfaces which unless otherwise eliminated would result in a reduction in the air-flow cross section through the compressor and hence, a change in the air-fuel oil ratio.

---

This invention relates to a method of and device for preventing deposits of contaminants in the flow path of turbo-generators, and more particularly such deposits in the diffusor component of radial compressors.

When gases containing dust are being delivered, deposits occur in turbo-compressors and lead to a considerable reduction in pressure ratio and efficiency. In the case of axial compressors, those points at which the flow becomes detached are above all affected. In the case of radial compressors, it has happened that even slight deposits, which can occur above all in the diffusor following the rotor even after a few hours of operation, can impair the nominal quantities of the compressor to an extent which cannot be explained by the reduction in cross-section. If such a compressor is being used as a supercharger for an internal-combustion engine, the efficiency of the plant drops and exhaust-gas temperatures can rise to an extent which cannot be permitted.

There are various known devices to make it possible to clean turbo-compressors associated with internal-combustion engines without any need for dismantling the said compressors. They are based on the idea of removing the accumulated deposits from time to time by means of an easily vaporizing solvent cleaning liquid. As experiments have shown, the cleaning effect is based predominantly on the mechanical action of the drops of liquid. The liquids must therefore be injected at the highest possible compressor speed. Since it is undesirable that the deposits, which have been accumulating for a long time, shall pass into the internal-combustion engine in concentrated form after solution, it is also known to discharge to atmosphere the gas which is delivered while cleaning is in progress. Among other things, these methods are difficult to use, and none of them leads to sufficient cleaning of the contaminated parts; the initial values of pressure ratio and efficiency are therefore no longer attained after cleaning.

The problem solved by the invention is therefore to prevent the formation of deposits in turbo-compressors, and thus avoid subsequent cleaning of the contaminated parts. This is attained as a result of the fact that those components bounding the flow path which are affected by deposits are permanently wetted by continuously admixing with the gas-flow a slow-vaporizing liquid of good wetting properties. Experiments have shown that no detrimental deposits form on surfaces wetted by liquids. The components bounding the flow path remain clean, and the nominal, i.e. rated, values of the compressor are unchanged even after a relatively long period of operation.

An example of one embodiment of the invention is diagrammatically illustrated in the attached drawing which is a longitudinal axial section.

With reference now to the drawing, the rotor 2 of a radial compressor aspirates at 1 the gas to be compressed, and delivers it to the collector spiral 3. The points where deposits most frequently occur are the blades 4 and the walls 5 of the diffusor. In order to prevent such deposits, a liquid, for example, engine oil, is according to the invention continuously admixed with the gas-flow through the feed pipe 6. It will be understood that this must occur ahead of the components to be protected, as seen in the direction of flow. The annular space 7 between the rotor 2 and the diffusor blades 4 could be suitable for this purpose, but this would require a fairly large expenditure on construction for uniform distribution to be imparted to the admitted liquid on the short path to the blades. It is more advantageous to carry out admixture of gas and wetting liquid on the suction side of the compressor rotor, as illustrated in the drawing. This can most simply be done by nozzles at the end of the feed pipes, the liquid being fed under pressure to the said nozzles by the pump 8. In principle, the same effect would also result from apertures in the wall of the housing through which the liquid would emerge, and from using the suction of the gas flowing past.

The quantity of liquid to be admixed with the gas may remain substantially constant with time, but it may also be made proportional to an operating quantity, for example, the through-put quantity of the compressor. Regulation is carried out, according to the example of embodiment in the drawing, by a valve 9 in the feed pipe 6, which valve can be controlled by a regulator (not shown) or manually. In the same way, regulation may be carried out by varying the pump pressure.

A liquid having good wetting properties must be chosen for admixing purposes, in order that each droplet impinging on a surface shall be distributed as rapidly as possible. It must also vaporize slowly in order to ensure a protective action over the whole flow path. Attention must furthermore be paid to the corrosive properties and, if appropriate also to any poisonous nature of the vapor or danger of explosion, the possibility of reaction with the gas being delivered and its intended use.

If the turbo-compressor serves to deliver combustion air for a thermal action, for example, for a gas turbine or an internal-combustion engine, it is expedient to admix a combustible liquid with the air-flow, advantageously the same liquid which is used as fuel in the thermal action, for example diesel oil. A single pump is then sufficient for fuel delivery and also admixture with the air-flow. In the case of diesel engines, admixture may be carried out by an additional pumping element of the existing injector pump, as indicated in the drawing on the pump 8. The use of such an injector pump confers the further advantage that the quantity to be admixed may be set and regulated independently of load, or in proportion to the quantities delivered by the pumping elements 10 to the cylinders of the engine. Therefore no further regulator member is necessary.

The choice of a combustible liquid for admixing with the combustion air confers the advantage that the quantity of fuel fed in conventional manner to the thermal action may be regulated to a correspondingly smaller amount.

The method described does not take effect only when the performance of the compressor has fallen off, but the cause of trouble is combatted as soon as it starts to arise, and the effects are thus prevented. The action which occurs after the turbo-compressor does not undergo any throttling or even interruption, and continuous trouble-free operation is thus ensured.

I claim:
1. In an internal combustion engine of the type powered by diesel fuel oil and which includes a fuel pump provided with discharge outlets for direct injection of the diesel fuel oil into the engine cylinders and a compressor of the radial type for supplying compressed combustion air to the engine the improvement wherein said fuel pump is provided with an additional fuel discharge outlet, and means connecting said additional fuel discharge outlet with said compressor for admixing fuel oil with the air passed through said compressor, said diesel oil serving to wet the internal wall surfaces of said compressor and thereby prevent any build-up of air contaminants such as dust on said wall surfaces which otherwise would result in a reduction in the air flow cross section through said compressor and a change in the air-fuel oil ratio.

References Cited

UNITED STATES PATENTS

| | | | |
|---|---|---|---|
| 572,178 | 12/1896 | Patterson | 230—127 |
| 2,184,731 | 12/1939 | Brewer | 230—127 |
| 2,280,845 | 4/1942 | Parker | 230—127 |
| 2,332,614 | 10/1943 | Swearingen | 230—127 |
| 2,419,598 | 4/1947 | Schey et al. | 230—127 |
| 1,998,784 | 4/1935 | Mock. | |
| 2,355,713 | 8/1944 | Durdin. | |

FOREIGN PATENTS

| | | |
|---|---|---|
| 745,590 | 2/1933 | France. |
| 475,711 | 5/1929 | Germany. |
| 920,234 | 11/1954 | Germany. |
| 7,598 | 1904 | Great Britain. |
| 13,930 | 1914 | Great Britain. |
| 404,134 | 1/1934 | Great Britain. |
| 472,987 | 10/1937 | Great Britain. |

HENRY F. RADUAZO, *Primary Examiner.*